C. HUNNICUTT.
SEED CORN GRADER.
APPLICATION FILED AUG. 22, 1910.
983,495.
Patented Feb. 7, 1911.
3 SHEETS—SHEET 1.
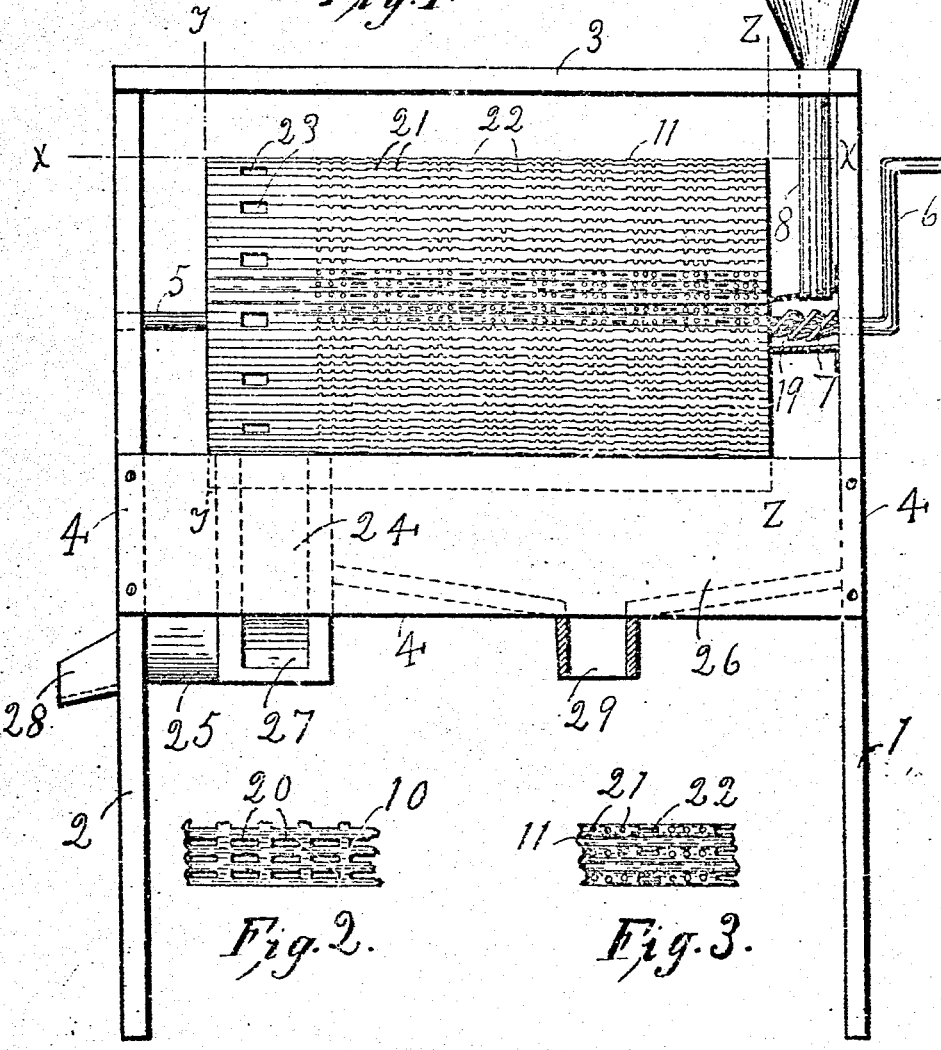
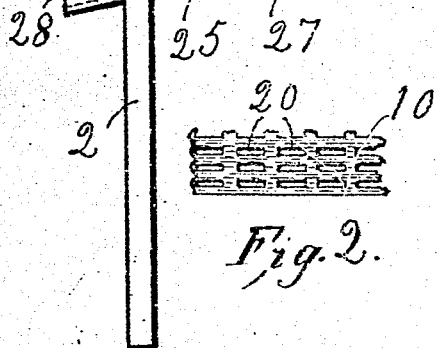
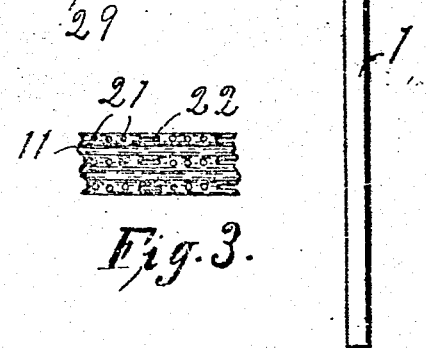
Witnesses
E. J. Rose
Margaret K. Rose
Charles Hunnicutt
Inventor

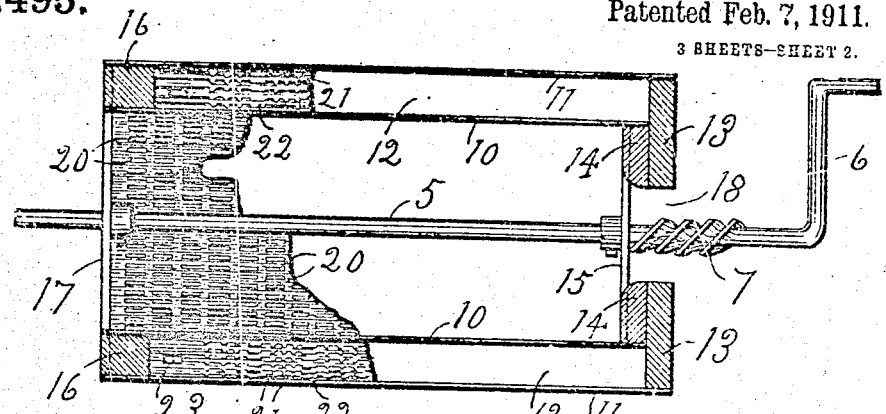
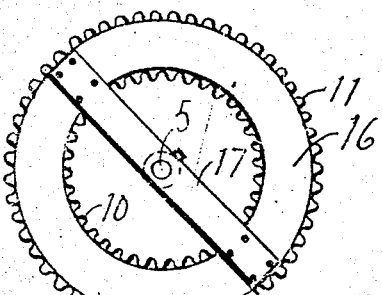
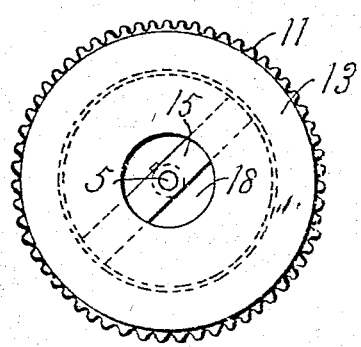
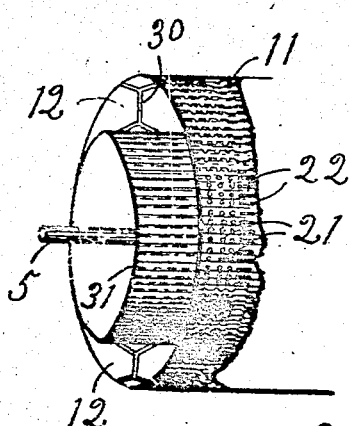

C. HUNNICUTT.
SEED CORN GRADER.
APPLICATION FILED AUG. 22, 1910.
983,495.
Patented Feb. 7, 1911.
3 SHEETS—SHEET 3.
Fig. 10.
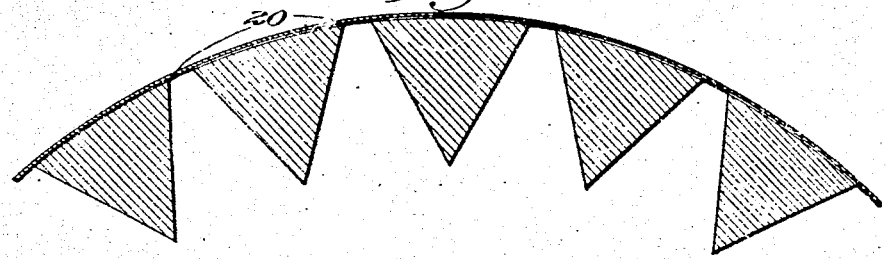
Fig. 11.
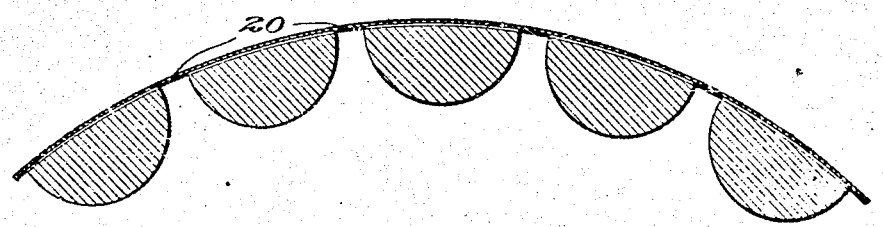
Fig. 12.
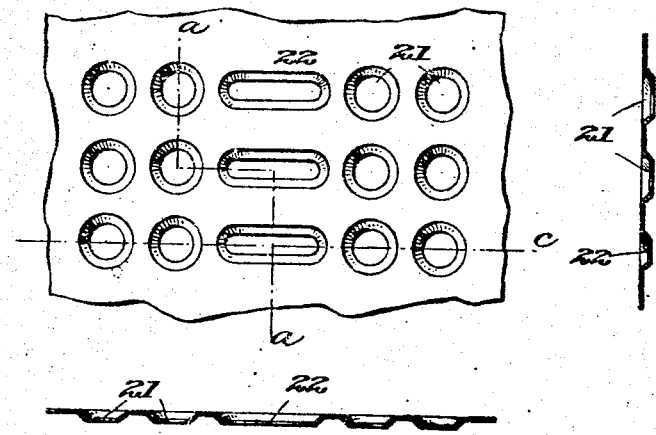
Fig. 13.
Fig. 14.
Witnesses:
Inventor.
Charles Hunnicutt.

UNITED STATES PATENT OFFICE.

CHARLES HUNNICUTT, OF WILMINGTON, OHIO.

SEED-CORN GRADER.

983,495.  Specification of Letters Patent.  Patented Feb. 7, 1911.

Application filed August 22, 1910. Serial No. 578,419.

*To all whom it may concern:*

Be it known that I, CHARLES HUNNICUTT, a citizen of the United States, residing at Wilmington, in the county of Clinton and State of Ohio, have invented a new and useful Improvement in Seed-Corn Graders, of which the following is a specification.

My invention relates to seed corn graders of the rotary type, and the object of the same is to produce a device that will readily separate from a mass of kernels of corn those kernels that do not conform in size and shape to the size and shape of the cells in the dropping mechanism of corn planting machines, or in other words, that will grade kernels of seed corn as to thickness and as to width, eliminating the smaller, thinner, and abnormally large or irregular shaped kernels from the larger symmetrical ones, which latter are more desirable for planting and reproduction, besides being adapted to be dropped far more uniformly by planting machines than is possible with ungraded corn.

Referring to my patent for seed corn grader No. 824,720, July 3, 1906, I show a construction with two screen drums arranged tandem, the end of one connected with the end of the other, and the initial mass of corn being delivered into the end of the upper and smaller apertured screen drum. This upper screen-drum eliminates the small and narrow kernels. The remainder of the corn is carried, by the rotation of the screens, into the lower large apertured screen-drum, through the apertures of which, all except the abnormally large kernels pass, said abnormally large kernels being discharged at the open end of the lower screen-drum. Now it is well known that a screen with small apertures is slower in its action than a screen of like size with larger apertures, and owing to the peculiar shapes of kernels of corn, and also owing to the fact that in grading corn as to width of kernel, the kernels must be made to enter the apertures of the small apertured screen vertically, this difference in working speed of the two kinds of screens is more pronounced in the grading of corn than in other grains.

In the use of the above device I have found that the upper screen section, which has the smaller apertures, is much slower in its action on the corn to be graded, than the lower screen section, and it does not fully complete its work before the corn is carried into the lower screen section, thus resulting in imperfect work. While this difficulty might, in a measure, be remedied by materially increasing the length of the upper screen section, yet this would make the machine too long and cumbersome, as well as more expensive to manufacture. My present device overcomes this difficulty by a construction in which the small apertured slow acting screen is made larger in diameter than the more rapid acting one, and the rapid acting screen is placed within the slower acting one, thus giving to the slow acting screen the greater screening area, by virtue of its greater circumference. This arrangement also permits of the initial mass of corn being delivered to the inner rapid acting screen first, which, by performing its function first, lessens the quantity of corn for the outer slower acting screen to handle, thereby enabling said outer screen to perform its function better and more rapidly.

Other objects and particular advantages of this invention will be clearly brought out or suggested in the course of the ensuing specification.

The preferred manner of detail construction for carrying out the general idea of this invention is described below and shown in the accompanying three sheets of drawings in which—

Figure 1, is a side elevation of my improved seed corn grader. Fig. 2, is an enlarged fragment or section of the inner screen. Fig. 3, is an enlarged fragment or section of the outer screen. Fig. 4, is a cross section of the inner screen showing the corrugations and position of the apertures therein. Fig. 5 is a cross section of a fragment of the top part of the outer screen showing the corrugations and the position of the apertures therein. Fig. 6, is a longitudinal section of the drum portion of the device taken on the line X—X of Fig. 1. Fig. 7, is an end view of the drum portion of the device taken on the line Y—Y of Fig.

1. Fig. 8, is an end view of the drum portion of the device taken on the line Z—Z of Fig. 1. Fig. 9, shows a modification in the construction of the lower end of the drum portion of the device. Figs. 10 and 11 show modifications of inner screen construction. Fig. 12 shows modifications of outer screen construction. Fig. 13, is a cross section taken on line a—a of Fig. 12. Fig. 14, is a cross section taken on line c—c of Fig. 12.

Similar reference numerals refer to similar parts throughout the several views.

My device is contained within a frame composed of end uprights 1 and 2, a top connecting bar 3, and intermediate horizontal connecting bars 4. In the upper part of said frame a shaft 5 is rotatably mounted in the uprights 1 and 2 and provided with a crank 6. The shaft 5 has a screw feed 7 mounted on it just inside the upright 1, to feed the corn to the inner screen, and immediately above said screw feed is an open ended tube 8 in communication with a hopper 9 on the connecting bar 3.

Two longitudinal corrugated screen drums 10 and 11 are horizontally mounted about the shaft 5 within the frame, one screen drum surrounding the other with a space 12 between the two. Said drums are supported at the upper end by the two disks 13 and 14 connected to a cross bar 15. The lower end of said drums are supported by a ring member 16 connected to a cross bar 17.

The disk 13 has permanently attached to it on its inner side a smaller disk 14 to the perimeter of which is attached the upper end of the inner screen drum 10. The lower end of said inner screen drum is left open and is attached to the inner periphery of the ring member 16 to which is attached the cross bar 17. One end of the outer screen drum is attached to the perimeter of the disk 13 and the other to the perimeter of the ring member 16. Said ring member 16 serves to support the screen drums, to space them apart, and to close the end of the space 12 between the screen drums.

The two connected disks 13 and 14 are provided with a central opening 18 leading to the inside of the inner screen drum. Leading through this central opening 18 to the inner screen is a conductor tube 19 which incloses the screw feed 7 and is attached to the frame upright 1, and is in communication with the open ended tube 8.

In the valleys of the corrugations of the inner screen 10 are formed a large number of apertures 20, said apertures being approximately 7/32 of an inch wide and about 1 inch long, said width being commonly regarded as the maximum thickness of standard kernels of corn. The length of said apertures 20 is immaterial, except that they should be at least as long as the width of the larger kernels of corn.

In the valleys of the corrugations of the outer screen 11 are formed a large number of round apertures 21 approximately 5/16 of an inch in diameter or length, said dimension being commonly regarded as the minimum width of standard kernels of corn. Distributed among these round apertures in the outer screen, arranged either in regular order or miscellaneously, are formed a number of oblong apertures 22 approximately 9/64 of an inch in width and 5/8 of an inch or more in length, said width being commonly regarded as the minimum thickness of standard kernels of corn.

Near the lower end of the outer screen 11, and beyond its screening openings, are formed large openings 23 for the discharge of the graded corn from the space 12 between the screen drums, said discharge openings being located directly above an inclined trough 24.

Supported by the connecting bars 4 and the frame uprights 1 and 2 are inclined discharge troughs 24, 25, and 26, terminating in spouts 27, 28, and 29. The inclined trough 24 is located directly beneath the discharge openings 23 of the outer screen, to receive the graded corn discharged from the space 12 between the screen drums. The inclined trough 25 is located directly in front of the open end of the inner screen drum, to receive the corn discharged from the same. The inclined trough 26 is located directly beneath the screening portion of the outer screen, to receive the corn passing through the apertures of said outer screen.

When the discharge end of the screen drums is constructed as shown in Fig. 9 of the drawings, the screening openings of the outer screen 11 may be continued to or near the lower end of the screen, and instead of the ring member 16, supports 30 may be employed to support and space the screen drums apart, thus leaving the lower end of the space 12 between the screen drums open for the discharge of the graded corn. In this event, to prevent the corn from the inner screen being discharged in the same trough with the graded corn, the inner screen 10 is provided with a spout extending outward beyond the end of the outer screen.

Before explaining the operation of my device I will here state that kernels of seed corn may be divided according to size and shape, into four distinct classes. First, the abnormally thick irregular shaped kernels. Second, the large symmetrical kernels. (This class constitutes the bulk of the corn, and may be termed the standard kernels.) Third, the abnormally thin kernels, that may be as wide as the standard kernels. Fourth, the small kernels. In this class are found kernels of various shapes and sizes, ranging from those that are as long and as thick as standard kernels, but narrower, on down to very small round-like ones.

To grade corn to thickness of kernel, the kernels must be made to enter the apertures edgewise; and to grade to width of kernel, they must be made to enter the apertures endwise.

My device accomplishes the separation and grading as follows:—When a quantity of shelled corn is placed into the hopper 9 and the crank 6 rotated the screw feed 7 carries the corn through the conductor tube 19 and delivers it into the inner screen drum 10, through the apertures 20 of said inner screen, the smallest kernels readily fall to the outer screen 11. By the rotation, the remainder of the corn is distributed over the surface of the inner screen, and by the aid of the corrugations, which serve as inclines to the apertures to turn the kernels up edgewise, all except the abnormally thick kernels are made to pass through the apertures 20 of the inner screen to the outer screen 11. The abnormally thick kernels intercepted by the inner screen are, by the rotation of the screen, gradually carried forward and discharged through the open end of the screen into the inclined trough 25, from which they pass out at the spout 28. The inner screen thus grades the corn as to thickness of kernel.

Of the corn that falls from the inner screen to the outer screen the smallest kernels and those that may be of standard length or thickness, but narrower than is desired for planting, are eliminated through the round apertures 21 into the inclined trough 26 from which they pass out at the spout 29. The diameter or length of these round apertures 21 is such as to prevent the passage of kernels that are of a width deemed desirable for seed and planting. And these round apertures therefore grade to width of kernel. The long narrow apertures 22 of the outer screen eliminate the abnormally thin kernels that are as wide as the standard kernels and which could therefore not pass through the round apertures, said thin kernels fall into the same inclined trough 26 with the small kernels and pass with them out at the spout 29, each being undesirable for seed.

The corrugations of the outer screen, as with the inner screen, serve as inclines to the apertures, to turn the kernels in an upright position so they can readily enter the apertures in the required manner.

The kernels that are too wide to pass through the round apertures 21, and too thick to pass through the narrow apertures 22 of the outer screen, may be termed the standard kernels, and are graded as to thickness and as to width. By the rotation of the screen these graded kernels are carried forward and delivered through the discharge openings 23 into the inclined trough 24 from which they pass through the spout 27 into a suitable receptacle for the graded corn.

Since the only function of the long narrow aperture 22 in the outer screen is to eliminate the abnormally thin kernels that are as wide as the standard kernels, and since kernels of this kind are not found in corn to any extent, except in certain localities, or in certain varieties of corn, this long narrow aperture may be omitted from the device, for use where such kernels are not present.

As the function of the round aperture 21 in the outer screen is to grade the kernels as to width, this width being determined by the diameter or length of the aperture, and while a round aperture best serves this purpose, yet apertures of other forms may be employed instead, as for instance, oval, elliptical, or rectangular apertures may be employed provided they are substantially as wide as the apertures of the inner screen, and the same length as the diameter of the round apertures. They must be as wide as the apertures of the inner screen (and may be wider) in order to permit the passage of narrow kernels that are often as thick as standard kernels.

The function of the corrugations of the screens being to form inclines leading to the apertures, instead of corrugations, suitable inclines may be formed in a smooth surface screen, by pressing the edges of the apertures down and outward, thus forming, in a sense, a funnel-shaped or countersunk aperture as shown in Fig. 12. The inner screen may also be formed of longitudinal strips or bars, either oval or triangular in cross section as shown in Figs. 10 and 11, which would serve the same purpose of turning the kernels up edgewise.

While the dimension of the screening openings as herein stated are such as to produce a grade of kernels that are commonly regarded as standard or desirable to plant, yet as the minimum width or thickness of kernels that may be deemed desirable for seed is a matter of opinion and not governed by any set rule, the same also being true of kernel-cells in planting machines, the dimensions of the screening openings here given may be varied somewhat as opinion or necessity may demand.

Other changes in detail construction could be made without departing from the spirit of the invention, as for instance, the screen drums could be made triangular, rectangular, or polygonal in cross section, and the screens may be made of other than sheet-metal. The size and proportion of the parts may also be varied to suit the requirements when desired to use this device for separating or grading other material than corn.

From the foregoing description and explanation it may be seen that the advantages of my construction over other devices of this class is, first, a greater relative screening area in the slower acting screen, at the same time a material decrease in the size of the machine for by placing one screen drum within the other, the length of the machine may be reduced nearly one half. Second, an increased efficiency in the slower acting screen, as a result of the initial mass of corn being first acted upon by the rapid acting screen, thereby lessening the quantity of corn for the outer slower acting screen to handle. Third, the smallest kernels being the first to fail through the inner screen they get to the apertures of the outer screen quickly and being unimpeded by the larger of the small kernels, which are slower in falling through, are eliminated more readily than if the initial mass of corn were delivered to the slower acting screen first. Fourth, the relative speed and efficiency of the two screens is harmonized, that is, by increasing the speed and efficiency of the slower acting screen as stated and shown, it is enabled to perform its function substantially as fast as the inner screen, thereby materially increasing the efficiency of the device as a whole. Fifth, a more compact construction, a lessened cost of manufacture, and a device more convenient to handle.

While the elements shown and described are well adapted to serve the purpose for which they are intended, it is to be understood that the invention is not limited to the precise construction set forth, but includes within its purview such changes as may be made within the scope of the appended claims.

What I claim is:

1. A seed corn grader comprising in combination two rotatable screens of different size, the larger surrounding the screening area of the smaller with a space between the two, said space being closed at both ends, the inner of said screens being open at one end, and provided with oblong screening openings of a given width, and the outer screen being provided with screening openings substantially as wide as those of the inner screen, but shorter than the same, a frame supporting said screens for rotation, means for delivering the corn to the inner screen, and discharge openings in said outer screen, near one end, for the delivery of the corn from the space between the screens.

2. A rotary seed corn grader comprising in combination two screen drums of different size, the larger surrounding the smaller with a space between the two, the inner screen drum being provided with oblong openings of a given width, and the outer screen drum being provided with screening openings substantially as wide as those of the inner screen, but shorter than the same, the screen body of said inner screen being formed with inclines leading to the screening openings therein, means for delivering the corn to said inner screen, and suitable means for rotating said screen drums.

3. A rotary seed corn grader comprising in combination two screen drums of different size, the larger surrounding the smaller with a space between the two, the inner screen drum being provided with oblong screening openings of a given width and the outer screen drum being provided with screening openings substantially as wide as those of the inner screen drum, but shorter than the same, the screen body of the outer of said screens being formed with inclines leading to the screening openings therein, means for delivering the corn to said inner screen drum, and suitable means for rotating said screen drums.

4. A seed corn grader comprising in combination two rotatable screens of different size, the larger surrounding the smaller with a space between the two, the inner of said screens being provided with oblong screening openings that are greater in length but substantially no greater in width than the screening openings of the outer screen, a frame supporting said screens for rotation, means for delivering the corn to said inner screen, and a discharge opening leading from the space between the screens.

5. A seed corn grader comprising in combination two rotatable screens of different size, the larger surrounding the smaller with a space between the two, the inner of said screens being provided with coarse apertures, and the outer screen being provided with finer apertures than those of the inner screen, the screen body of said inner screen being formed with inclines leading to the apertures therein, a frame supporting said screens for rotation, means for delivering the corn to the inner screen, and a discharge opening leading from the space between the screens.

6. A rotary seed corn grader comprising in combination two screen drums of different size, the larger surrounding the smaller with a space between the two, the inner of said screen drums being provided with oblong screening openings, and the outer of said screen drums being provided with a number of screening openings interspersed with other openings that are greater in length but less in width than said first named openings, suitable means for delivering the corn to said inner screen drum, and means for rotating said screen drums.

7. A rotary seed corn grader comprising in combination two screen drums of different size, the larger surrounding the smaller with a space between the two, the inner of said screen drums being provided with oblong screening openings, and the outer of said screen drums being provided with a number of screening openings interspersed with other screening openings that are greater in length but less in width than said first named openings, the screen body of said inner screen being formed with inclines leading to the screening openings therein and means for rotating said screen drums.

CHARLES HUNNICUTT

Witnesses:
H. G. CARTWRIGHT,
JOE T. DOAN.